US012580401B2

(12) United States Patent
Qu et al.

(10) Patent No.: US 12,580,401 B2
(45) Date of Patent: Mar. 17, 2026

(54) CHARGE SYSTEM FOR WIRELESS TEMPERATURE PROBE

(71) Applicant: SHENZHEN KUKI ELECTRONIC CO., LTD., Guangdong (CN)

(72) Inventors: Guo Qu, Guangdong (CN); Donghai Mei, Guangdong (CN); Hengshou Qiu, Guangdong (CN); Weihua Xiu, Guangdong (CN); Xiangjie He, Guangdong (CN); Chenglin Yang, Guangdong (CN); Youming Shen, Guangdong (CN)

(73) Assignee: SHENZHEN KUKI ELECTRONIC CO., LTD., Guangdong (CN)

( * ) Notice: Subject to any disclaimer, the term of this patent is extended or adjusted under 35 U.S.C. 154(b) by 28 days.

(21) Appl. No.: 19/211,420

(22) Filed: May 19, 2025

(65) Prior Publication Data

US 2026/0045811 A1 Feb. 12, 2026

Related U.S. Application Data

(62) Division of application No. 18/898,786, filed on Sep. 27, 2024.

(30) Foreign Application Priority Data

Aug. 7, 2024 (CN) .......................... 202411077767.4

(51) Int. Cl.
*H02J 7/00* (2006.01)
*H02J 50/00* (2016.01)
*H02J 50/10* (2016.01)
(52) U.S. Cl.
CPC .......... *H02J 7/0044* (2013.01); *H02J 50/005* (2020.01); *G01K 2215/00* (2013.01); *H02J 50/10* (2016.02)

(58) Field of Classification Search
CPC ..................................................... H02J 7/0044
(Continued)

(56) References Cited

U.S. PATENT DOCUMENTS

2013/0011102 A1 1/2013 Rinzler et al.
2019/0339133 A1 11/2019 Pulvermacher et al.
(Continued)

FOREIGN PATENT DOCUMENTS

CN 215524878 U 1/2022
CN 219287185 U 6/2023
JP 3246172 U 3/2024

OTHER PUBLICATIONS

First Office Action received in corresponding Chinese patent application No. 202411077767.4, dated Feb. 14, 2025, 12 pages.
(Continued)

*Primary Examiner* — Ahmed H Omar
(74) *Attorney, Agent, or Firm* — Cooper Legal Group, LLC

(57) ABSTRACT

A charge system for wireless temperature probe includes a probe body and a charging relay box detachably connected with the probe body, the probe body is provided with a first wireless charging component and a sealing structure. The charging relay box is internally provided with a power supply module, a control module and a second wireless charging component configured to establish a near field communication path with the first wireless charging component, and the control module is used to control the power supply module to adaptively supply power to the probe body through the near field communication path, the probe body comprises a handle, a sealing ring, a probe tube and an internal assembly, a head of the internal assembly is inserted in the probe tube, and a tail of the internal assembly is inserted in the handle.

2 Claims, 11 Drawing Sheets

(58) Field of Classification Search

USPC .......................................................... 320/108

See application file for complete search history.

(56) References Cited

U.S. PATENT DOCUMENTS

| | | |
|---|---|---|
| 2021/0282467 A1 | 9/2021 | Antonopoulos et al. |
| 2022/0294272 A1 | 9/2022 | Lee et al. |
| 2023/0086159 A1* | 3/2023 | Jee ........................ H02J 7/0048 |
| | | 219/626 |
| 2024/0310215 A1* | 9/2024 | Wang ...................... G01K 1/024 |
| 2024/0418576 A1* | 12/2024 | Zhu ........................ G01K 1/024 |

OTHER PUBLICATIONS

Non-Final Office Action received in corresponding U.S. Appl. No. 18/898,786, dated Feb. 24, 2025, 19 pages.

* cited by examiner

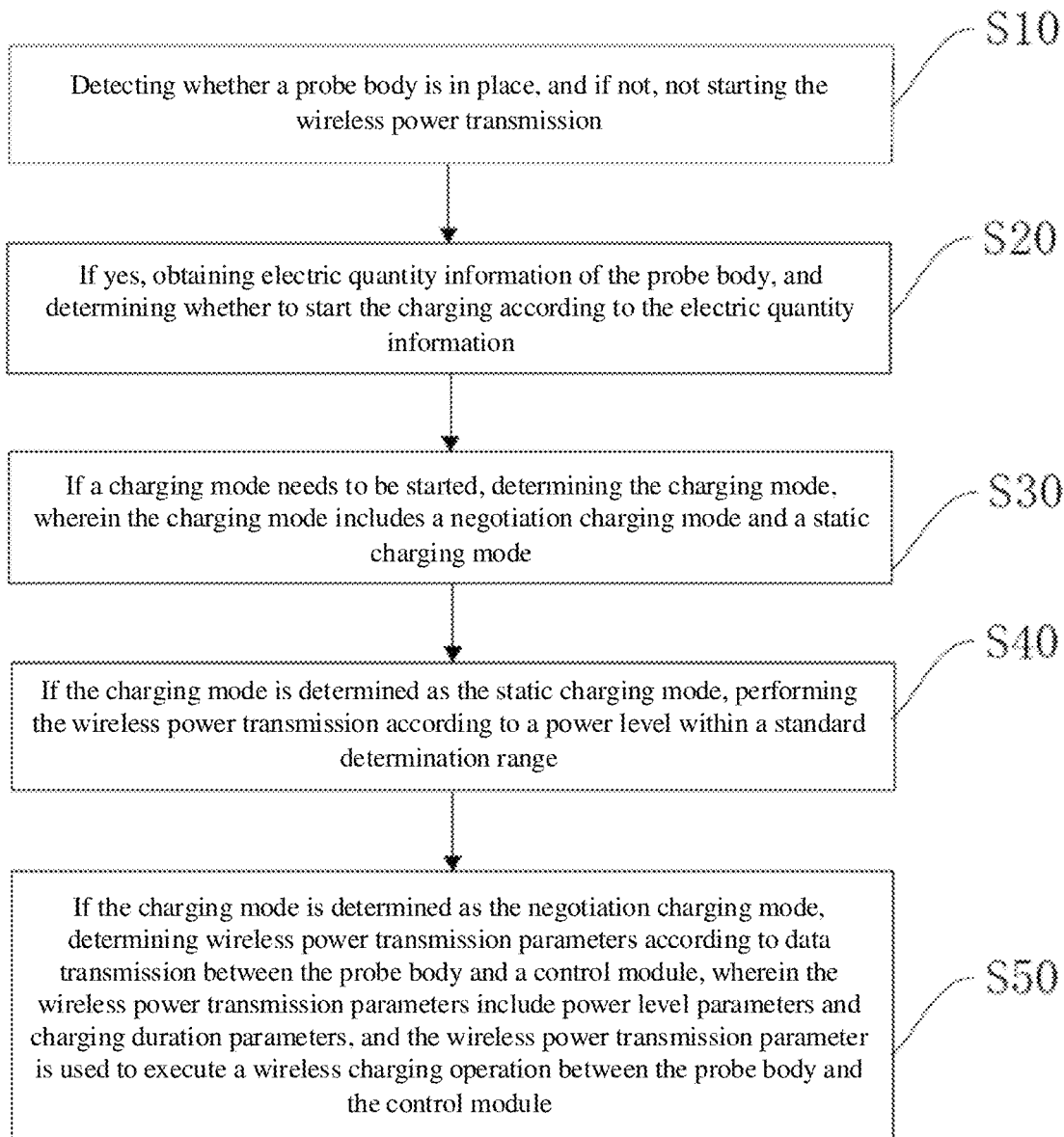

Detecting whether a probe body is in place, and if not, not starting the wireless power transmission          S10

If yes, obtaining electric quantity information of the probe body, and determining whether to start the charging according to the electric quantity information          S20

If a charging mode needs to be started, determining the charging mode, wherein the charging mode includes a negotiation charging mode and a static charging mode          S30

If the charging mode is determined as the static charging mode, performing the wireless power transmission according to a power level within a standard determination range          S40

If the charging mode is determined as the negotiation charging mode, determining wireless power transmission parameters according to data transmission between the probe body and a control module, wherein the wireless power transmission parameters include power level parameters and charging duration parameters, and the wireless power transmission parameter is used to execute a wireless charging operation between the probe body and the control module          S50

FIG. 10

Figure 11:
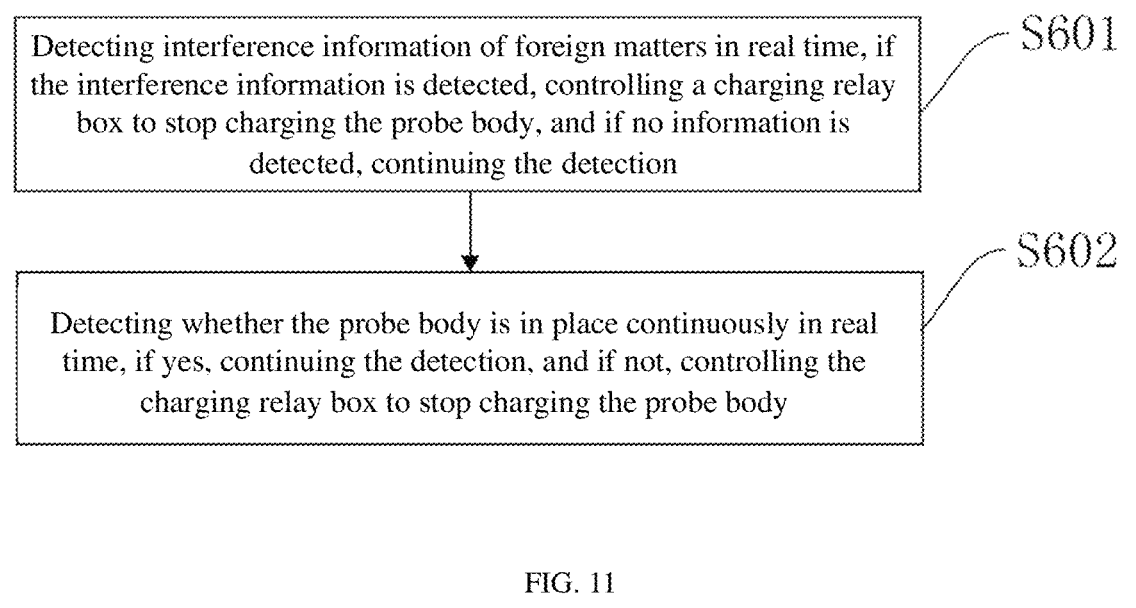

Detecting interference information of foreign matters in real time, if the interference information is detected, controlling a charging relay box to stop charging the probe body, and if no information is detected, continuing the detection

S601

Detecting whether the probe body is in place continuously in real time, if yes, continuing the detection, and if not, controlling the charging relay box to stop charging the probe body

CHARGE SYSTEM FOR WIRELESS TEMPERATURE PROBE

CROSS-REFERENCE TO RELATED APPLICATION

The present application is a divisional of U.S. application Ser. No. 18/898,786, filed on Sep. 27, 2024, which is based on and claims the priority benefits of China application No. 202411077767.4, filed on Aug. 7, 2024. The entireties of U.S. application Ser. No. 18/898,786 and China application No. 202411077767.4 are hereby incorporated by reference herein and made a part of this specification.

TECHNICAL FIELD

The present disclosure relates to the technical field of a charge system for wireless temperature probe, and, in particular, to a charge system for wireless temperature probe.

BACKGROUND ART

At present, probe charging boxes on the market generally adopt a leaf-spring contact approach. For example, the Chinese patent with the publication No. CN219287185U discloses a temperature probe and a matched base apparatus, which adopts a charging method with leaf-spring clamp. It may be seen from the above patent document that the existing wireless probes are usually charged by way of leaf-spring contact, which has the following shortcomings: first, leaf springs have requirement for structural strength and use and will wear with the increase of use times; secondly, it is determined by the engagement mode of the leaf spring and a base that the product has sealing problems and may not be waterproof and oil-proof completely; and thirdly, external static electricity may be introduced into a PCBA inside the probe by the metal leaf spring, which may cause electrostatic interference or damage to functions of the probe.

SUMMARY

In order to solve the problems that the existing wireless probe may have abnormalities such as wearing, poor sealing and electrostatic interference when being charged by way of leaf-spring contact, the present application provides a charge system for wireless temperature probe.

A charge system for wireless temperature probe includes a probe body and a charging relay box detachably connected with the probe body, the probe body is provided with a first wireless charging component and a sealing structure configured for sealing the first wireless charging component, the charging relay box is internally provided with a power supply module, a control module and a second wireless charging component configured to establish a near field communication path with the first wireless charging component, and the control module is configured to control the power supply module to adaptively supply power to the probe body through the near field communication path.

By the traditional wired charging method, it is necessary to physically connect a charger with a device, which may cause poor contact by loosening of interfaces, oxidation or other reasons, thus influencing the charging effect. By adopting the above technical solution according to the present application, the wireless near field connection way is used for charging, to substitute the existing leaf-spring contact based charging approach. The wireless charging method solves the problem of poor contact of the existing charging method and is more stable in long-term use. The near-field based wireless charging may be an NFC based wireless charging approach, so that a charging loop is formed between the temperature probe and the charging relay box without physical contact, which may realize an isolated contactless charging. Furthermore, the sealing structure of the first wireless charging component may solve the problem of poor sealing performance of the traditional charging apparatus effectively, and may be completely waterproof and oil-proof. Moreover, an electrostatic introduction channel is blocked, so that the electrostatic interference may be avoided effectively.

Optionally, the charging relay box includes a first upper shell and a first lower shell, an accommodation cavity is defined in the first upper shell and the first lower shell, the first upper shell is configured with a first through hole in communication with the accommodation cavity, the accommodation cavity is internally provided with a probe sleeve, an orifice of the probe sleeve corresponds to the first through hole, so that the probe sleeve is in movable sleeved on the probe body, and the second wireless charging component includes a second charging coil sleeved on the probe sleeve.

By adopting the above technical solution, the probe sleeve and the second charging coil are provided in the charging relay box, such that the probe body is movably inserted in the charging relay box, thereby facilitating the removal and installation of the probe, and thus ensuring the stability and reliability of the wireless charging.

Optionally, the probe body includes a first handle, a first sealing ring, a first probe tube and a first internal assembly, the first wireless charging component includes a first charging coil sleeved on a tail of the first internal assembly and corresponding to the second charging coil, a head of the first internal assembly is inserted in the first probe tube, the first handle includes a first handle portion in plug-in connection with the probe sleeve and a first sealing portion with a diameter smaller than a diameter of the first handle portion, the first sealing ring is sleeved on the first sealing portion, the tail of the first probe tube is sleeved on the first sealing ring, the first handle portion is internally configured with a recessed hole, the recessed hole passes through the first sealing portion in a direction towards the first sealing portion, so that the tail of the first internal assembly and the first charging coil are inserted in the recessed hole, and the first handle, the first sealing ring and the first probe tube form a sealing structure for sealing the first wireless charging component through a glass sintering process or a metal brazing process.

By adopting the above technical solution, the probe body is provided with the first handle, the first sealing ring, the first probe tube and the first internal assembly, and the first handle is configured with the slot hole and the sealing structure, which realizes an effective sealing for the first wireless charging component at the probe body, so that the waterproof, oil-proof and anti-static performance of the probe is improved while facilitating the removal and installation of the probe.

Optionally, the charging relay box includes a second upper shell and a second lower shell, the power supply module and the control module are arranged between the second upper shell and the second lower shell, the second upper shell is configured with a first clamping slit, the first clamping slit is in clamping connection with the probe body, the second wireless charging component includes a fourth charging coil lying on the control module, a second through hole is formed beside the fourth charging coil at the control module, the second through hole is matched with a first limit groove extending towards the second through hole from the second upper shell, and the first limit groove is configured to limit the probe body.

By adopting the above technical solution, the charging relay box is provided with the first clamping slit and the first limit groove, and the control module is provided with the fourth charging coil and the through hole, which realizes the clamping and limiting for the probe body, so that the stability of connection between the probe and the charging relay box is improved, and the accuracy and efficiency of the wireless charging are ensured.

Optionally, the probe body includes a second handle, a second sealing ring, a second probe tube and a second internal assembly, a head of the second internal assembly is inserted in the second probe tube, a tail of the second internal assembly is inserted in the second handle, the first wireless charging component includes a third charging coil lying on the tail of the second internal assembly and corresponding to the fourth charging coil, the second handle includes a second handle portion, a second sealing portion with a diameter smaller than a diameter of the second handle portion, the second sealing ring is sleeved on the second sealing portion, a tail of the second probe tube is sleeved on the second sealing ring, the second sealing ring and the second probe tube form a sealing structure for sealing the first wireless charging component through a glass sintering process or a metal brazing process, a junction between the second handle portion and the tail of the second probe tube is matched with the first limit groove to limit position, and a surface of the second handle portion close to the second upper shell is configured as a plane, so as to abut against the second upper shell.

By adopting the above technical solution, the probe body is provided with the second handle, the second sealing ring, the second probe tube and the second internal assembly, and the second handle and the second probe tube are provided with the sealing structure and the matching structure for limiting position, which realizes the effective sealing for the first wireless charging component at the probe body and the stable connection with the charging relay box, thereby improving the waterproof and oil-proof performance and the charging reliability of the probe.

Optionally, the charging relay box includes a third upper shell and a third lower shell, the power supply module and the control module are arranged between the third upper shell and the third lower shell, the third upper shell is configured with a second clamping slit, the clamping slit is in clamping connection with the probe body, an outer side of the third upper shell is configured with a second limit groove, the second limit groove is open upwards of the third upper shell, the second limit groove is configured to limit a tail of the probe body, the third upper shell is internally provided with a clamping plate extending downwards of the third lower shell, the second wireless charging component includes a sixth charging coil located in a gap between the clamping plate and the third upper shell, the second charging coil corresponds to the tail of the probe body.

By adopting the above technical solution, the charging relay box is provided with the second clamping slit, the second limit groove and the clamping plate, and the sixth charging coil is arranged in the gap between the clamping plate and the third upper shell, which realizes the clamping, limiting and wireless charging functions of the probe body, thereby improving the connection stability and charging efficiency of the probe and the charging relay box.

Optionally, the probe body includes the probe body includes a third handle, a third sealing ring, a third needle tube and a third internal assembly, a head of the third internal assembly is inserted in the third needle tube, a tail of the third internal assembly is inserted in the third handle, the first wireless charging component includes a fifth charging coil connected to the tail of the third internal assembly and corresponding to the sixth charging coil, the third handle includes a third handle portion, a third sealing portion with a diameter smaller than a diameter of the third handle portion and a stop part with a diameter greater than a diameter of the third handle portion, the stop part is matched with the second limit groove for limiting position, the third sealing ring is sleeved on the third sealing portion, a tail of the third probe tube is sleeved on the third sealing ring, the fifth charging coil is located inside the stop part, and the third handle, the third sealing ring and the third probe tube form a sealing structure for sealing the first wireless charging component through a glass sintering process or a metal brazing process.

By adopting the above technical solution, the probe body is provided with the third handle, the third sealing ring, the third probe tube and the third internal assembly, and the third handle is provided with the third sealing portion and the stop part, which realizes the sealing and stable connection of the first wireless charging component at the probe body. Additionally, the fifth charging coil corresponds to the sixth charging coil, so that the reliability and accuracy of the wireless charging are ensured.

Optionally, the charge system for wireless temperature probe further includes a power switching module, a wireless transmission module and a Bluetooth module, which are located in the charging relay box, and a wireless receiving module and a battery module of probe, which are located at the probe body, a power output end of the power supply module is connected with a power input end of the power switching module, a detection end of the power switching module is configured to detect a voltage signal of an external adapter, so as to control a power supply switching between an external adapter and the power supply module, a data port of the Bluetooth module is connected with a first data port of the control module, a second data port of the control module is connected with a data port of the wireless transmission module, a signal output end of the wireless transmission module is connected with a signal input end of the second wireless charging component, the first wireless charging component is configured to output power to a power input end of the wireless receiving module through near field communication, and a power output end of the wireless receiving module is connected with a power input end of the battery module of probe.

By adopting the above technical solution, the charging relay box and the probe body are provided with the power switching module, the wireless transmission module and the Bluetooth module, and the probe body is provided with the wireless receiving module and the battery module of probe, which realizes the adaptive power supply, wireless charging and data communication functions of the probe body, thereby improving the intelligentization and reliability of the system.

BRIEF DESCRIPTION OF THE DRAWINGS

FIG. 10 is flow chart of a charge method for wireless temperature probe in an embodiment of the present application.

FIG. 11 is a flow chart of a foreign matter detection process in an embodiment of the present application.

DETAILED DESCRIPTION

Figure 1:
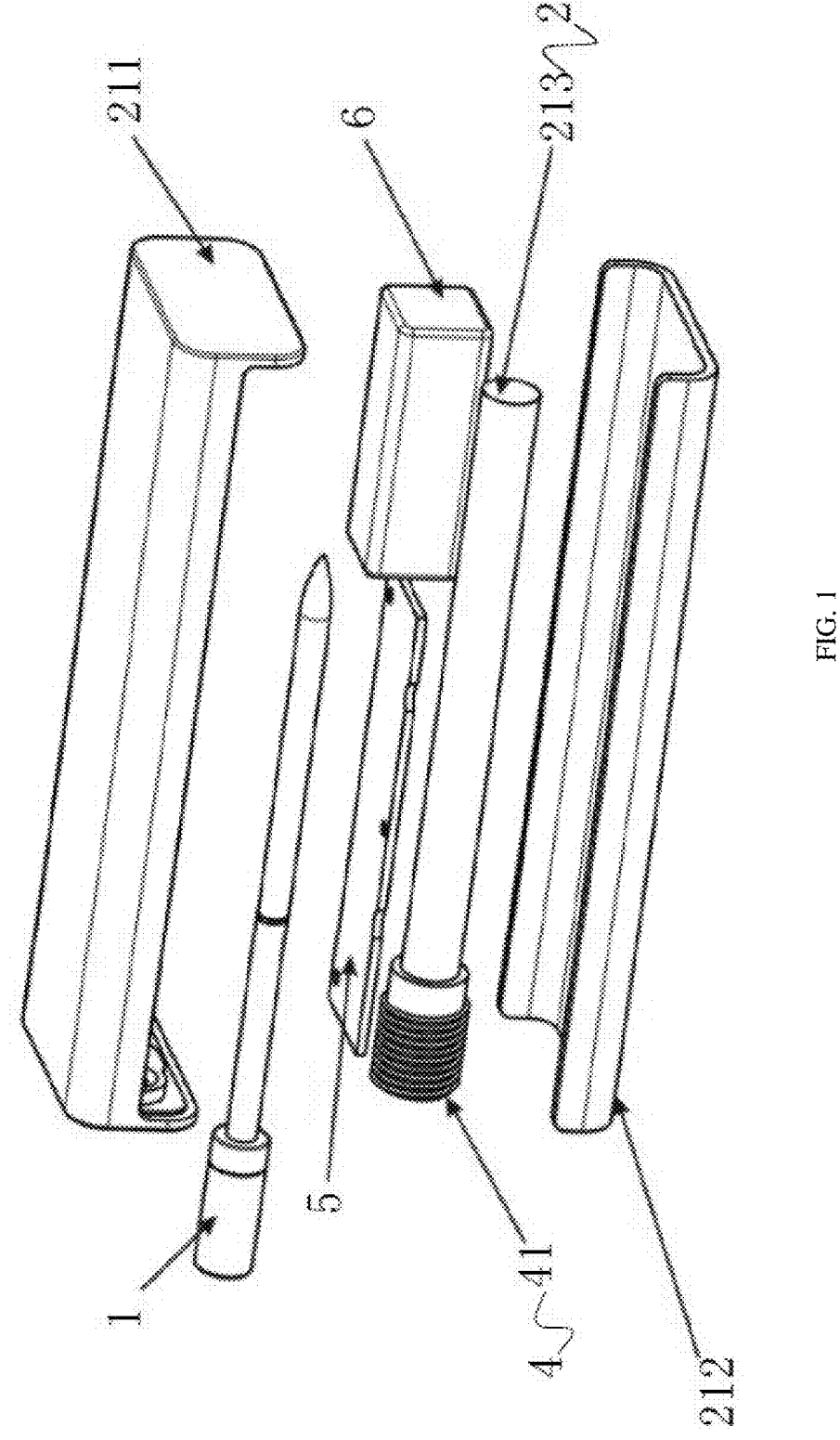
FIG. 1 is a three-dimensional structural schematic view of a charge system for wireless temperature probe in a first embodiment of the present application.

The present application is further described in detail below in combination with the accompanying drawings.

In an embodiment, as shown in FIGS. 1-8, the present application discloses a charge system for wireless temperature probe.

A charge system for wireless temperature probe includes a probe body 1 and a charging relay box 2 detachably connected with the probe body 1. The probe body 1 is provided with a first wireless charging component 3 and a sealing structure for sealing the first wireless charging component 3. The charging relay box 2 is internally provided with a second wireless charging component 4, which establishes a near field communication path with the first wireless charging component 3, a power supply module 6 and a control module 5. The control module 5 is configured to control the power supply module 6 to adaptively supply power to the probe body 1 through the near field communication path.

In the present embodiment, the wireless temperature probe, i.e., the probe body 1 is charged by means of a wireless near field communication connection. By means of the wireless charge, the problem of poor contact by the existing charging way may be solved, and it is more stable for long-term use. The charging coil of the wireless temperature probe, i.e. the first wireless charging component 3 may be configured as a Bluetooth antenna, so that it is unnecessary to design other antennas. According to the design of a sealing structure of a novel probe, the Bluetooth antenna and the charging relay box 2 may be coupled in a plurality of ways for wireless charging and communication data interaction. A key innovation of the present application is to adopt the near-field based wireless charging approach to substitute the existing leaf-spring contact based charging approach, so that it is unnecessary to form a charging loop by means of physic contact, thereby realizing an isolated contactless charging, which solves the problem of the existing leaf-spring contact based charging approach completely, saves leaf spring clamps, and optimizes the structure. By the temperature probe, a complete sealing may be achieved, thereby solving the sealing problem effectively, and thus achieving a complete waterproof and oil-proof function. Additionally, due to the complete sealing of the temperature probe, an electrostatic introduction channel is blocked, which may solve the problem of electrostatic interference effectively.

Optionally, the near-field based wireless charging approach may be an NFC based wireless charging technology, and by the NFC based wireless charging technology, a radio frequency of 13.56 MHz is used for near field communication and power transmission between the relay box and the probe. The charging relay box 2 is used as an NFC power transmitter (i.e. WLC-P), the probe body 1 is used as a power receiver (i.e. WLC-L), and the basic principle of the power transmission between the charging relay box and the probe body is near field magnetic induction.

Some models of NFC wireless charging chip may be as follows:

1) Transmission chip CTN730 and receiving chip CRN120 of NXP;
2) Transmission chip ST25R3916B and receiving chip ST25DV04KC of ST;
3) Transmission chip ML7631/ML7671 and receiving chip ML7630/ML7670 of Rohm;
4) Transmission chip PTX130 W and receiving chip PTX30 W of Renesas.

Optionally, the near field magnetic induction technology shows unique advantages in the above cases of the probe body 1 and the charging relay box 2. Firstly, by the near field magnetic induction technology, an efficient energy transmission may be realized. Since a strong magnetic field is established between the coil in the charging relay box 2 and the coil at the probe body 1, the energy loss in the transmission process is minimized, thereby ensuring the high efficiency of the charging process. Secondly, the near field magnetic induction technology has excellent safety, which will not produce any electromagnetic radiation and cause any potential health risk for the human body or peripheral environment. Furthermore, since the magnetic field is high in intensity and limited in action range, the energy transmission may occur only when the probe body 1 is very close to the charging relay box 2, so that the interference on other devices or persons may be avoided effectively. Finally, the near field magnetic induction technology further has excellent stability and reliability, may adapt to various complicated use environments, to ensure the continuous and stable power supply for the probe body 1.

In conclusion, in the present application, the charging is performed by means of the wireless near field communication connection, so that the problem of poor contact of the existing charging approach is solved, and the long-term use is more stable. In the traditional wired charging way, it is necessary to physically connect the charger with the device, which may lead to poor contact due to loose interface, interface oxidation or other reasons, thereby influencing the charging effect. The wireless charging technology is used to substitute the existing leaf-spring contact based charging approach, so that it is unnecessary to form a charging loop by physic contact, by which the near-field based wireless charging approach may be an NFC based wireless charging approach, which may realize an isolated contactless charging, so that the poor contact caused by the wearing may be prevented. Furthermore, by means of the sealing structure of the probe body 1 for sealing the first wireless charging component 3, the problem of poor sealing performance of the traditional charging apparatus may be solved, and a complete waterproof and oil-proof effect may be achieved. Moreover, an electrostatic introduction channel is blocked, so that the problem of electrostatic interference may be solved effectively.

In an embodiment, besides the NFC based wireless charging approach, the near-field based wireless charging approach may also include magnetic induction wireless charging (e.g. Qi standard) and magnetic resonance wireless charging. These approaches use the electromagnetic field to transmit energy in a short distance, thereby realizing a contactless charging among the devices. The magnetic induction technology is usually applied to small devices such as mobile phones, smart watches and the like, and the magnetic resonance technology may realize the charging in a long distance and may support simultaneous charging for a plurality of devices.

Figure 3:
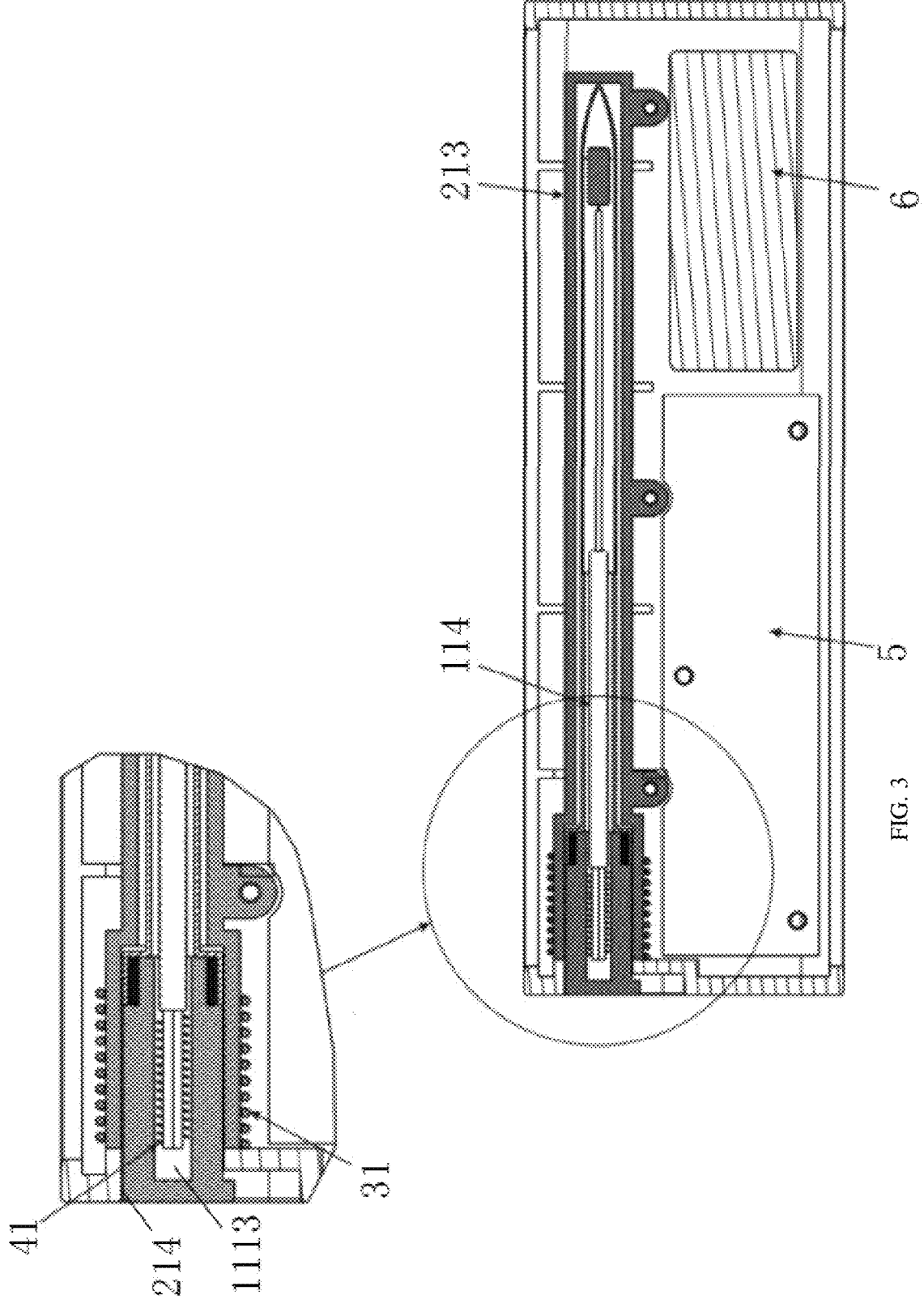
FIG. 3 is a sectional schematic view of a charge system for wireless temperature probe in the first embodiment of the present application when viewed from the top.

Further, as shown in FIG. 1 and FIG. 3, the charging relay box 2 includes a first upper shell 211 and a first lower shell 212, an accommodation cavity is defined in the first upper shell 211 and the first lower shell 212. The first upper shell 211 is configured with a first through hole 214 in communication with the accommodation cavity and configured for the probe body 1 to be insert in and removed. A probe sleeve 213 is provided in the accommodation cavity, an orifice of the probe sleeve 213 corresponds to the first through hole 214, so that the probe body 1 is movably sleeved on the probe sleeve 213, thereby realizing the detachable connection between the probe body 1 and the charging relay box 2. The second wireless charging component 4 includes a second charging coil 41 sleeved on the probe sleeve 213, and the second charging coil is sleeved on the probe sleeve 213 and corresponds to the wireless charging component at the probe body 1. When the probe body 1 is inserted into the charging relay box 2, the wireless charging component at the probe body 1 is opposite to the second charging coil 41, so as to realize a wireless charging based on the near field magnetic induction principle. The wireless charging component at the probe body 1 converts the electric energy into a magnetic field, and the second charging coil 41 converts the magnetic field into the electric energy, so as to charge the probe body 1. In the whole process, there is no direct physic contact between the probe body 1 and the charging relay box 2, thereby avoiding the problems such as poor contact, and thus improving the charging stability and reliability.

Optionally, a ceramic handle and a metal probe tube of the wireless temperature probe are integrated by means of glass sintering (or brazing), so as to achieve a better waterproof sealing performance. After internal components are installed, the intermediate parts of the metal probe tube are welded together by laser welding, and the weld seam is located at a position where a guard wire of laser welding ring 8 of the temperature probe is located. A battery (a lithium battery or a dry battery) is provided in a charging box, which may charge the temperature probe through the above wireless charging way.

In conclusion, in the present embodiment, the probe sleeve 213 and the second charging coil 41 are arranged in the charging relay box 2, which realizes a movable engagement between the probe body 1 and the charging relay box 2, thereby facilitating the removal and installation of the probe, and ensuring the stability and reliability of the wireless charging.

Figure 2:
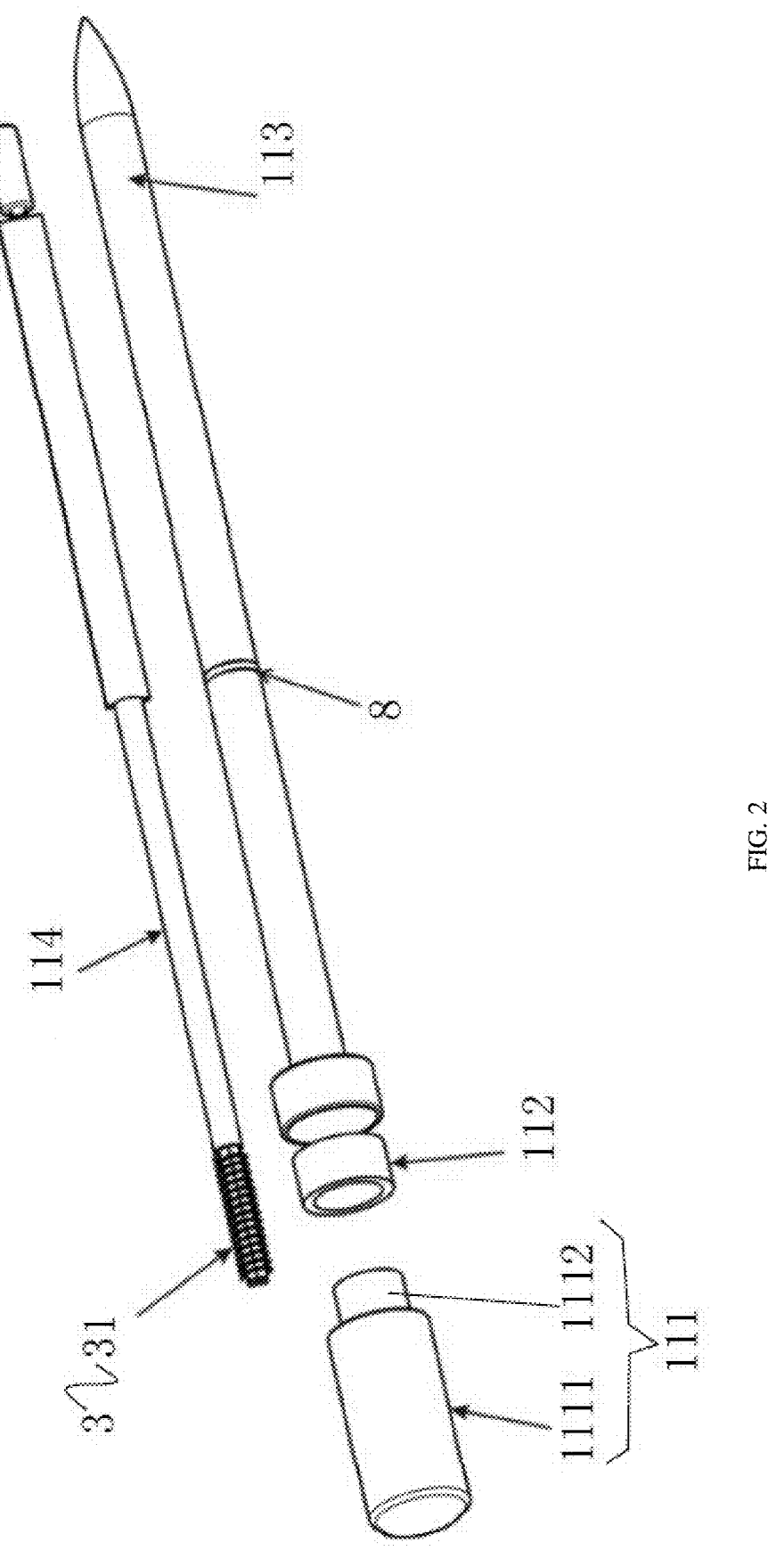
FIG. 2 is a three-dimensional structural schematic view of a probe body in the first embodiment of the present application.

Further, as shown in FIG. 2, the probe body 1 includes a first handle 111, a first sealing ring 112, a first probe tube 113 and a first internal assembly 114. The first wireless charging component 3 includes a first charging coil 31 sleeved over the tail of the first internal assembly 114 and corresponding to the second charging coil 41. The head of the first internal assembly 114 is inserted into the first probe tube 113 and configured to fix the first internal assembly 114. The first handle 111 includes a first handle portion 1111 sleeved on the probe sleeve 213, and a first sealing portion 1112 with a diameter smaller than that of the first handle portion 1111. The first sealing ring 112 is sleeved on the first sealing portion 1112, and the tail of the first probe tube 113 is sleeved on the first sealing ring 112. The first handle portion 1111 is internally configured with a slot hole 1113, the slot hole 1113 passes through the first sealing portion 1112 in a direction close to the first sealing portion 1112, so that the tail of the first internal assembly 114 and the first charging coil 31 may be inserted into the slot hole 1113. The first handle 111, the first sealing ring 112 and the first probe tube 113 form a sealing structure for sealing the first wireless charging component 3 through a glass sintering process or a metal brazing process.

In the present embodiment, the probe body 1 consists of a plurality of structures, including the first handle 111, the first sealing ring 112, the first probe tube 113 and the first internal assembly 114. The first handle 111 is configured for people to hold the probe body 1 and has a first handle portion 1111 and a first sealing portion 1112. The first handle portion 1111 is matched with the probe sleeve 213, to realize the connection between the probe body 1 and the charging relay box 2. The diameter of the first sealing portion 1112 is smaller than that of the firsts handle portion 1111, to improve the sealing performance of the probe body 1. The first sealing ring 112 is sleeved on the first sealing portion 1112 to further improve the sealing performance of the probe body 1. The tail of the first probe tube 113 is sleeved on the first sealing ring 112 to fix the first sealing ring 112.

When the probe body 1 is inserted into the charging relay box 2, the first handle portion 1111 is matched with the probe sleeve 213 to realize the connection between the probe body 1 and the charging relay box 2. At the same time, the first sealing portion 1112, the first sealing ring 112 and the first probe tube 113 work together to form the sealing structure to prevent external liquid or gas from entering the probe body 1. The tail of the first internal assembly 114 and the first charging coil 31 are inserted in the slot hole 1113 and correspond to the second charging coil 41, so that the wireless charging is realized based on the near field magnetic induction principle. The electric energy is transmitted to the probe body 1 from the charging relay box 2, to provide power to the electronic elements inside the probe body 1, so as to realize the functions of the probe body 1. In the whole process, there is no direct physic contact between the probe body 1 and the charging relay box 2, so that the charging stability and reliability may be improved.

Optionally, 1) process for the glass sealing structure: sleeving a glass ring on a ceramic tube; sleeving a metal piece on a glass tube-compacting the three materials; placing them into a high-temperature nitrogen furnace at 800° C. for sintering; forming the sealing structure; testing the sealing performance.

2) Brazing process of the sealing structure: smearing brazing solder at the outer circumference of a ceramic tube; sleeving a metal tube on a part of the ceramic tube where the brazing solder is smeared; compacting the three materials; placing them into a high-temperature nitrogen furnace at 800-1000° C. for sintering; forming the sealing structure; testing the sealing performance.

In conclusion, in the present embodiment, the probe body 1 is provided with the first handle 111, the first sealing ring 112, the first probe tube 113 and the first internal assembly 114, and the first handle 111 is configured with the slot hole 1113 and the sealing structure, so as to effectively seal the first wireless charging component 3 at the probe body 1, thereby improving the waterproof, oil-proof and antistatic performance of the probe, and also facilitating the removal and installation of the probe.

Figure 4:
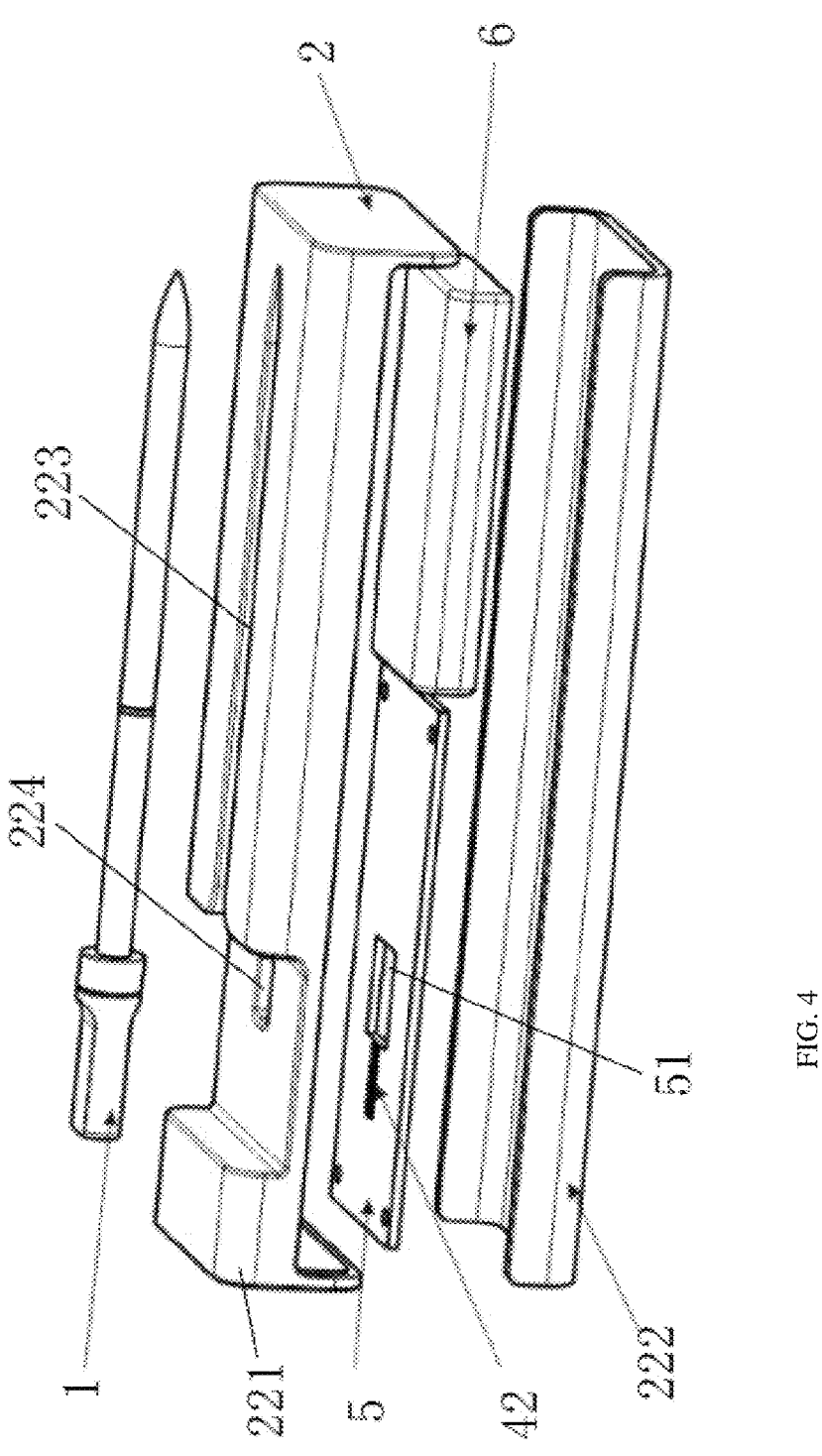
FIG. 4 is a three-dimensional structural schematic view of a charge system for wireless temperature probe in a second embodiment of the present application.

Further, as shown in FIG. 4, the charging relay box 2 includes a second upper shell 221 and a second lower shell 222, and a power supply module 6 and a control module 5 are arranged between the second upper shell 221 and the second lower shell 222. The second upper shell 221 is configured with a first clamping slit 223, and the first clamping slit 223 is in clamping fit with the probe body 1. The second wireless charging component 4 includes a fourth charging coil 42 lying on the control module 5. The control module 5 is configured with a second through hole 51 beside the fourth charging coil 42, the second through hole 51 is matched with the first limit groove 224, which extends towards the second through hole 51 from the second upper shell 221, and the first limit groove 224 is configured to limit the probe body 1.

In the present embodiment, the charging relay box 2 includes the second upper shell 221 and the second lower shell 222 and forms an accommodation space to hold the power supply module 6 and the control module 5. The power supply module 6 is configured to supply power to the probe body 1, and the control module 5 is configured to control a charging process and communicate with the probe body 1. The second upper shell 221 is configured with the first clamping slit 223, and the first clamping slit is matched with the probe body 1 in shape and configured to fix the probe body 1 at the charging relay box 2. When the probe body 1 is inserted into the charging relay box 2, the first clamping slit 223 may tightly clamp the probe body 1, to ensure that the probe body may not loosen or drop off in the charging process. The second wireless charging component 4 includes a fourth charging coil 42, which lies on the control module 5 and configured for electromagnetic induction coupling with the wireless charging component at the probe body 1. A magnetic field generated by the fourth charging coil 42 may pass through the probe body 1 to interact with the wireless charging component inside the probe body, thereby realizing the wireless charging. The control module 5 is configured with a through hole beside the fourth charging coil 42, and the through hole is matched with the first limit groove 224. The first limit groove 224 extends towards the through hole from the second upper shell 221 and is configured to limit a movement range of the probe body 1 in the charging relay box 2. When the probe body 1 is inserted into the charging relay box 2, the tail of the probe body may contact the first limit groove 224, so that the probe body is limited on a specific position. Through the linkage of these structural components, the charging relay box 2 may fix the probe body 1 firmly and may perform an effective wireless charging with the wireless charging components in the probe body. Additionally, the first limit groove 224 ensures that the probe body 1 may not move or dislocate excessively in the charging process, thereby improving the reliability and accuracy of the charging.

In conclusion, in the present embodiment, the charging relay box 2 is configured with the first clamping slit 223 and the first limit groove 224, and the control module 5 is provided with the fourth charging coil 42 and the through hole, so as to clamp and limit the probe body 1, thereby improving the stability of the connection between the probe body and the charging relay box 2, and ensuring the accuracy and efficiency of the wireless charging.

Figure 5:
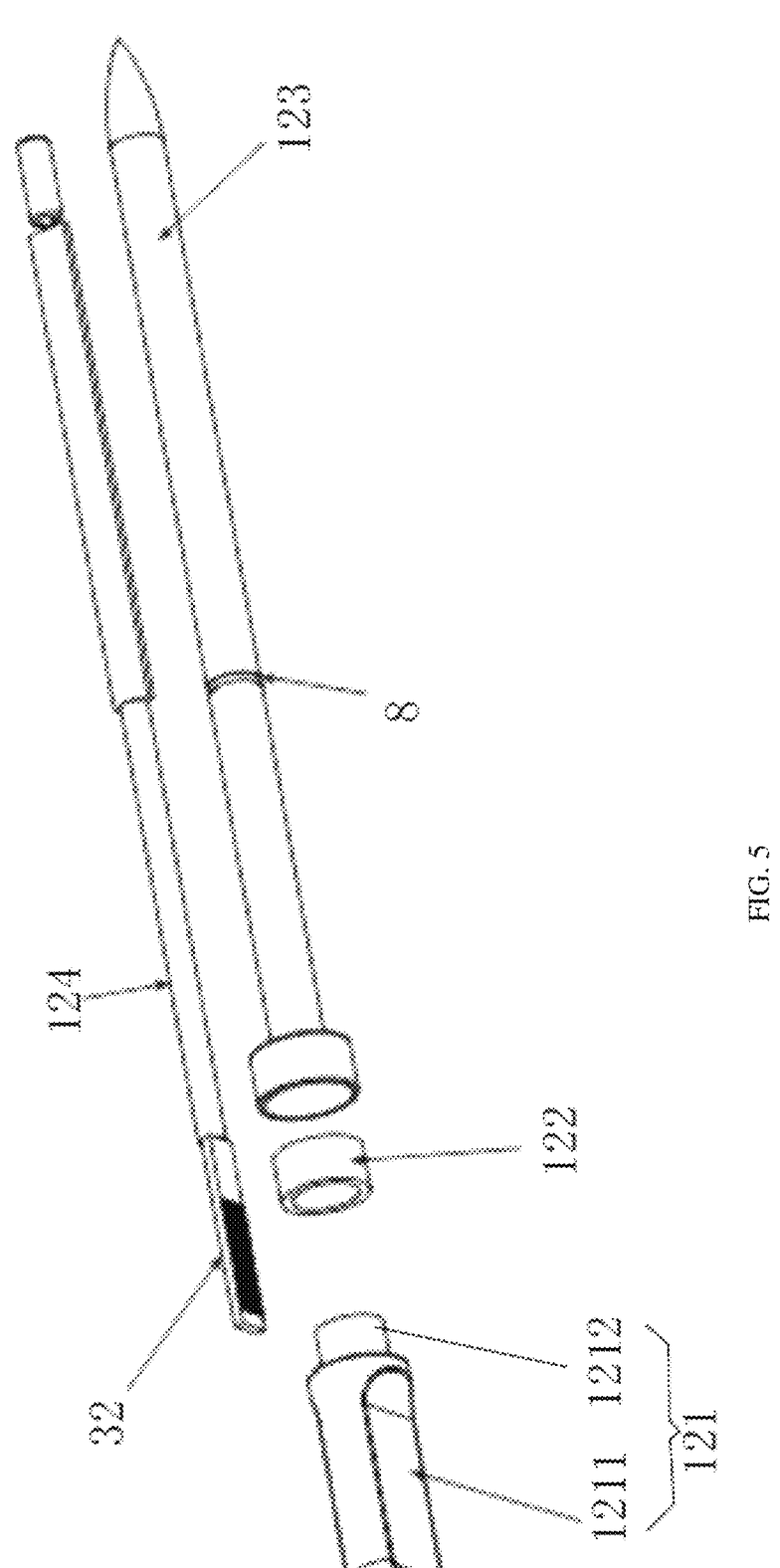
FIG. 5 is a three-dimensional structural schematic view of a probe body in the second embodiment of the present application.

Further, as shown in FIG. 5, the probe body 1 includes a second handle 121, a second sealing ring 122, a second probe tube 123 and a second internal assembly 124, the head of the second internal assembly 124 is inserted in the second probe tube 123, and the tail of the second internal assembly 124 is inserted in the second handle 121. The first wireless charging component 3 includes a third charging coil 32 lying on the tail of the second internal assembly 124 and corresponding to the fourth charging coil 42. The second handle 121 includes a second handle portion 1211 and a second sealing portion 1212 with a diameter smaller than that of the second handle portion 1211, the second sealing ring 122 is sleeved on the second sealing portion 1212, and the tail of the second probe tube 123 is sleeved on the second sealing ring 122. The second handle 121, the second sealing ring 122 and the second probe tube 123 form a sealing structure for sealing the first wireless charging component 3 through a glass sintering process or a metal brazing process. A junction between the second handle portion 1211 and the tail of the second probe tube 123 is matched with the first limit groove 224 for limiting position, and a surface of the second handle portion 1211 close to the second upper shell 221 is a plane so as to abut against the second upper shell 221.

In the present embodiment, the probe body 1 includes the second handle 121, the second sealing ring 122, the second probe tube 123 and the second internal assembly 124. The second handle 121 includes the second handle portion 1211 and the second sealing portion 1212, by which the second handle portion 1211 is configured for people to hold the probe body 1 and has a plane matched with the second upper shell 221 at the charging relay box 2 so as to realize the stable connection between the probe body 1 and the charging relay box 2. The diameter of the second sealing portion 1212 is smaller than that of the second handle portion 1211, to improve the sealing performance of the probe body 1. The second sealing ring 122 is sleeved on the second sealing portion 1212 to further strengthen the sealing structure of the probe body 1. The tail of the second probe tube 123 is sleeved on the second sealing ring 122 to fix the second sealing ring 122 and ensures a sealing effect between it and the second sealing portion 1212. The second internal assembly 124 includes a first wireless charging component 3, i.e. the third charging coil 32. The third charging coil lies on the tail of the second internal assembly 124 and corresponds to the fourth charging coil 42 at the charging relay box 2, to realize the wireless charging. When the probe body 1 is inserted into the charging relay box 2, the third charging coil 32 is opposite to the fourth charging coil 42, so that the wireless transmission of the electric energy is realized based on the electromagnetic induction principle. The junction between the second handle portion 1211 and the tail of the second probe tube 123 is matched with the first limit groove 224 on the charging relay box 2, to limit the movement range of the probe body 1 in the charging relay box 2. When the probe body 1 is inserted into the charging relay box 2, the junction may contact the first limit groove 224, so that the probe body 1 is fixed on a specific position. Through the linkage of the above structural components, the probe body 1 may be connected with the charging relay box 2 stably and reliably and form a good sealing structure to protect electronic elements inside the probe body 1 against the influence of an external environment. Additionally, the third charging coil 32 at the probe body 1 may perform an efficient wireless charging in combination with the fourth charging coil 42 at the charging relay box 2 so as to provide the required electric energy for the probe body 1.

In conclusion, in the present embodiment, the probe body 1 is provided with the second handle 121, the second sealing ring 122, the second probe tube 123 and the second internal assembly 124, and the second handle 121 and the second probe tube 123 are provided with the sealing structure and the matching structures for limiting, which realizes the effective sealing effect on the first wireless charging component 3 at the probe body 1 and the stable connection with the charging relay box 2, thereby improving the waterproof and oil-proof performance and the charging reliability of the probe.

Figure 6:
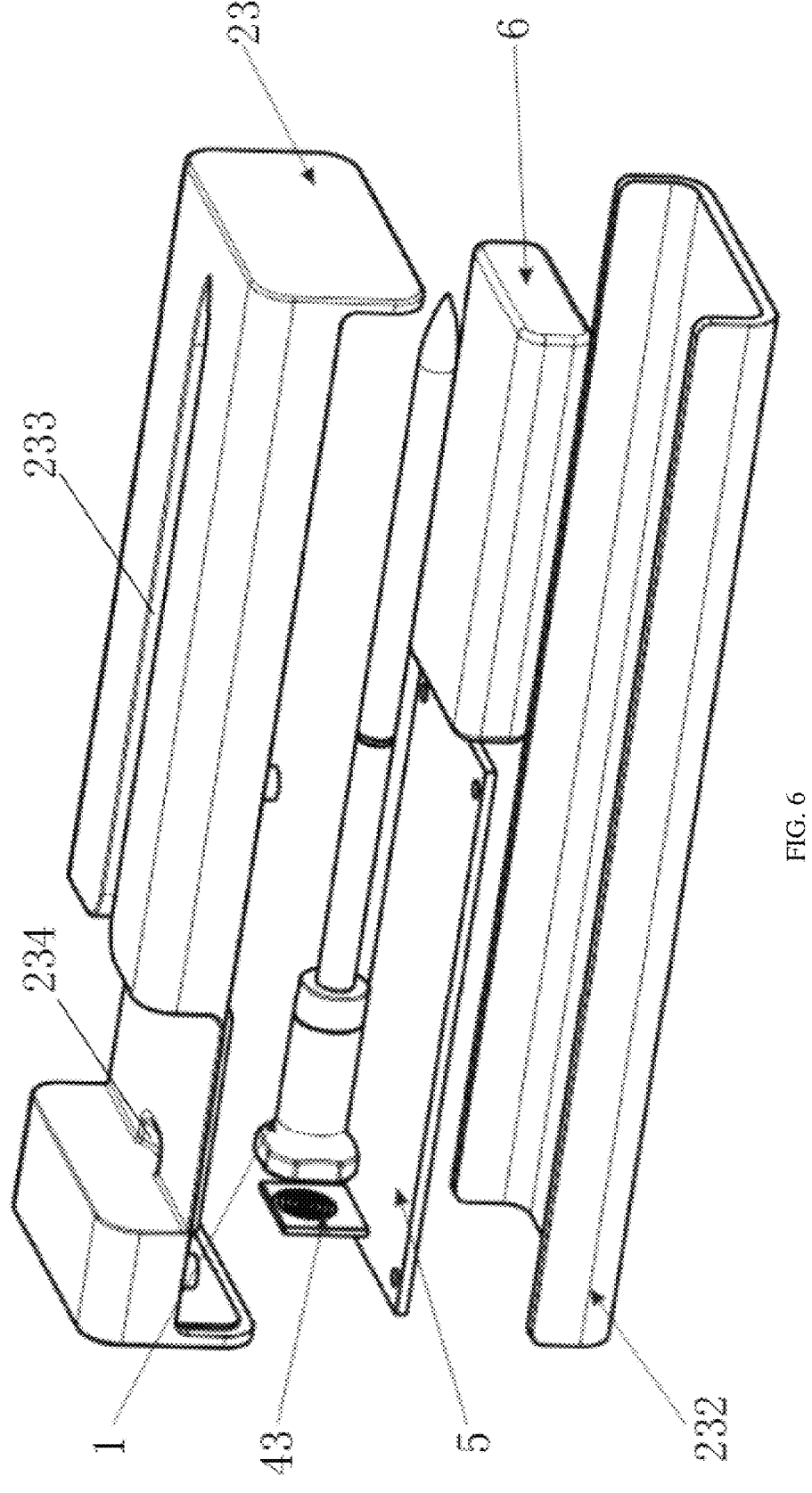
FIG. 6 is a three-dimensional structural schematic view of a charge system for wireless temperature probe in a third embodiment of the present application.
Figure 8:
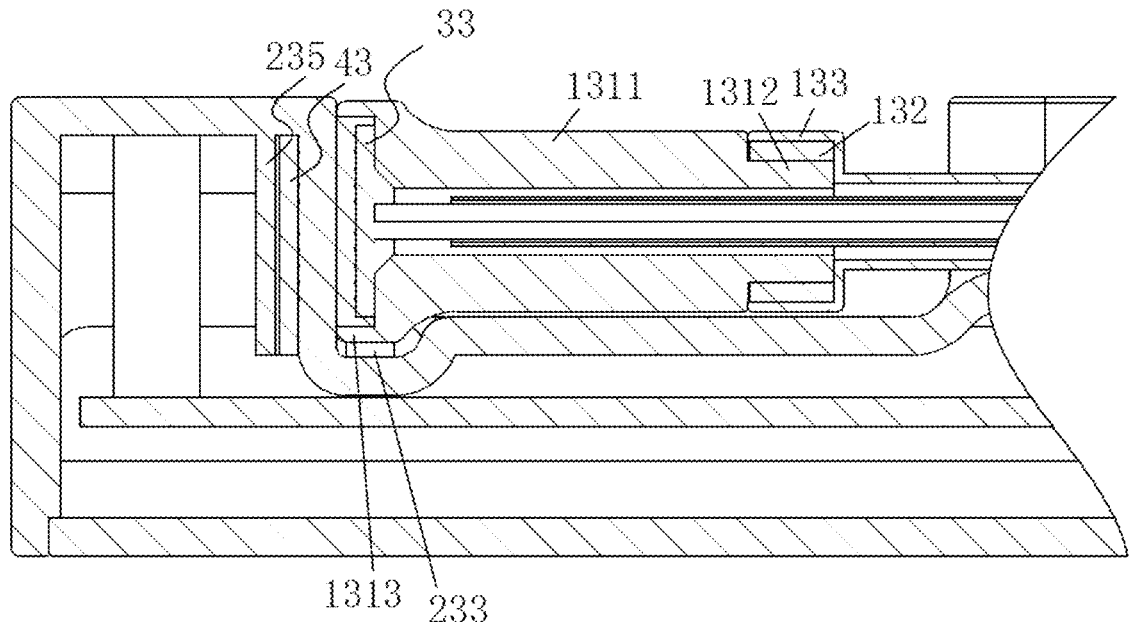
FIG. 8 is a section view of a charge system for wireless temperature probe in the first embodiment of the present application when viewed from the front.

Further, as shown in FIG. 6 and FIG. 8, the charging relay box 2 includes a third upper shell 231 and a third lower shell 232, the power supply module 6 and the control module 5 are arranged between the third upper shell 231 and the third lower shell 232. The third upper shell 231 is configured with a second clamping slit 233, the second clamping slit 233 clamps the probe body 1. The outer side of the third upper shell 231 is configured with a second limit groove 234, which is open towards the upper side of the third upper shell 231, and the second limit groove 234 is configured to limit the tail of the probe body 1. The third upper shell 231 is internally provided with a clamping plate 235 extending towards the lower side of the third lower shell 232. The second wireless charging component 4 includes a sixth charging coil 43 located in a gap between the clamping plate 235 and the third upper shell 231, and the sixth charging coil 43 corresponds to the tail of the probe body 1.

In conclusion, in the present embodiment, the charging relay box 2 is configured with the second clamping slit 233, the second limit groove 234 and the clamping plate 235, and the sixth charging coil 43 is arranged in the gap between the clamping plate 235 and the third upper shell 231, which realizes the clamping, limiting and wireless charging functions of the probe body 1, thereby improving the connection stability and the charging efficiency of the probe and the charging relay box 2.

Figure 7:
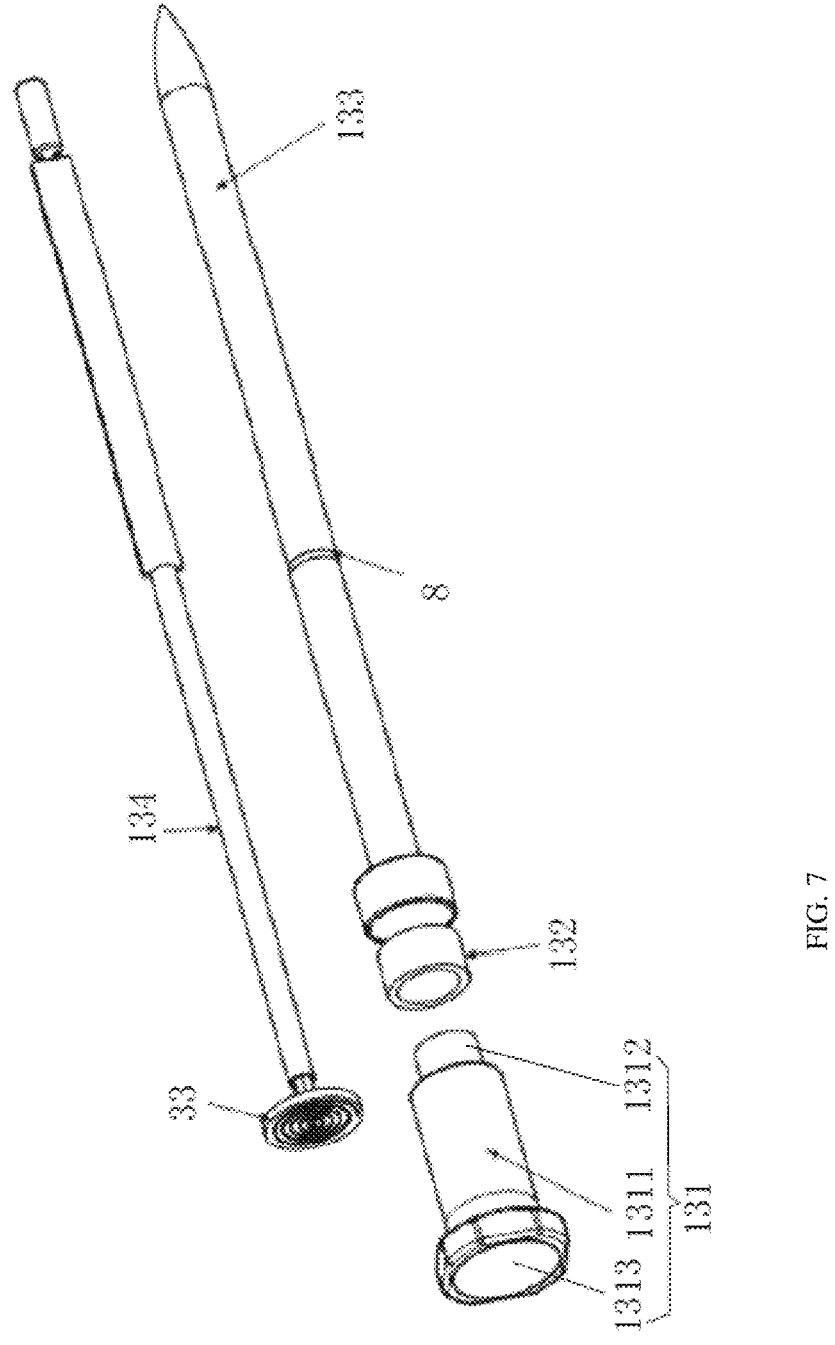
FIG. 7 is a three-dimensional structural schematic view of a probe body in a third embodiment of the present application.

Further, as shown in FIG. 7, the probe body 1 includes a third handle 131, a third sealing ring 132, a third probe tube 133 and a third internal assembly 134, the head of the third internal assembly 134 is inserted into the third probe tube 133, and the tail of the third internal assembly 134 is inserted into the third handle 131. The first wireless charging component 3 includes a fifth charging coil 33 connected to the tail of the third internal assembly 134 and corresponding to the sixth charging coil 43. The third handle 131 includes a third handle portion 1311, a third sealing portion 1312 with a diameter smaller than that of the third handle portion 1311 and a stop part 1313 with a diameter greater than that of the third handle portion 1311 and matched with the second limit groove 234 for limiting position. The third sealing ring 132 is sleeved on the third sealing portion 1312, the tail of the third probe tube 133 is sleeved on the third sealing ring 132, and the fifth charging coil 33 is located inside the stop part 1313. The third handle 131, the third sealing ring 132 and the third probe tube 133 form a sealing structure for sealing the first wireless charging component 3 through the glass sintering process or the metal brazing process.

In the present embodiment, the probe body 1 consists of a plurality of structures, including the third handle 131, the third sealing ring 132, the third probe tube 133 and the third internal assembly 134. The third handle 131 is configured for people to hold the probe body 1 and includes the third handle portion 1311, the third sealing portion 1312 and the stop part 1313. The third handle portion 1311 is configured to be connected with the charging relay box 2, and the diameter of the third sealing portion 1312 is smaller than that of the third handle portion 1311 to improve the sealing performance of the probe body 1. The diameter of the stop part 1313 is greater than that of the third handle portion 1311 to be matched with the second limit groove 234 at the charging relay box 2, so as to position the probe body 1 in the charging relay box 2. The third sealing ring 132 is sleeved on the third sealing portion 1312 to further strengthen the sealing structure of the probe body 1. The tail of the third probe tube 133 is sleeved on the third sealing ring 132, to fix the third sealing ring 132 and ensure the sealing effect between it and the third sealing portion 1312. The third internal assembly 134 includes the first wireless charging component 3, i.e. the fifth charging coil 33. The fifth charging coil is connected to the tail of the third internal assembly 134 and corresponds to the sixth charging coil 43 at the charging relay box 2, to realize a wireless charging. When the probe body 1 is inserted into the charging relay box 2, the fifth charging coil 33 is opposite to the sixth charging coil 43, so that the wireless transmission of the electric energy is realized based on the electromagnetic induction principle. The stop part 1313 is located outside the third handle 131, and when the probe body 1 is inserted into the charging relay box 2, the stop part 1313 is matched with the second limit groove 234 to fix the probe body 1 in the charging relay box 2, thereby preventing the probe body from moving in the charging process. Additionally, the stop part 1313 further facilitates the formation of the sealing structure for sealing the first wireless charging component 3, and protects the fifth charging coil 33 against the influence of the external environment. Through the linkage of these structural components, the probe body 1 may be connected with the charging relay box 2 stably and reliably and form a good sealing structure to protect electronic elements inside the probe body 1 against the influence of external environment. Additionally, the fifth charging coil 33 at the probe body 1 may perform an efficient wireless charging in combination with the sixth charging coil 43 at the charging relay box 2, so as to provide the required electric energy for the probe body 1.

In conclusion, in the present embodiment, the probe body 1 is provided with the third handle 131, the third sealing ring 132, the third probe tube 133 and the third internal assembly 134, and the third handle 131 is provided with the third sealing portion 1312 and the stop part 1313, which realizes the sealing and stable connection with the first wireless charging component 3 at the probe body 1, in addition, the fifth charging coil 33 is opposite to the sixth charging coil 43, so that the reliability and accuracy of the wireless charging are ensured.

Figure 9:
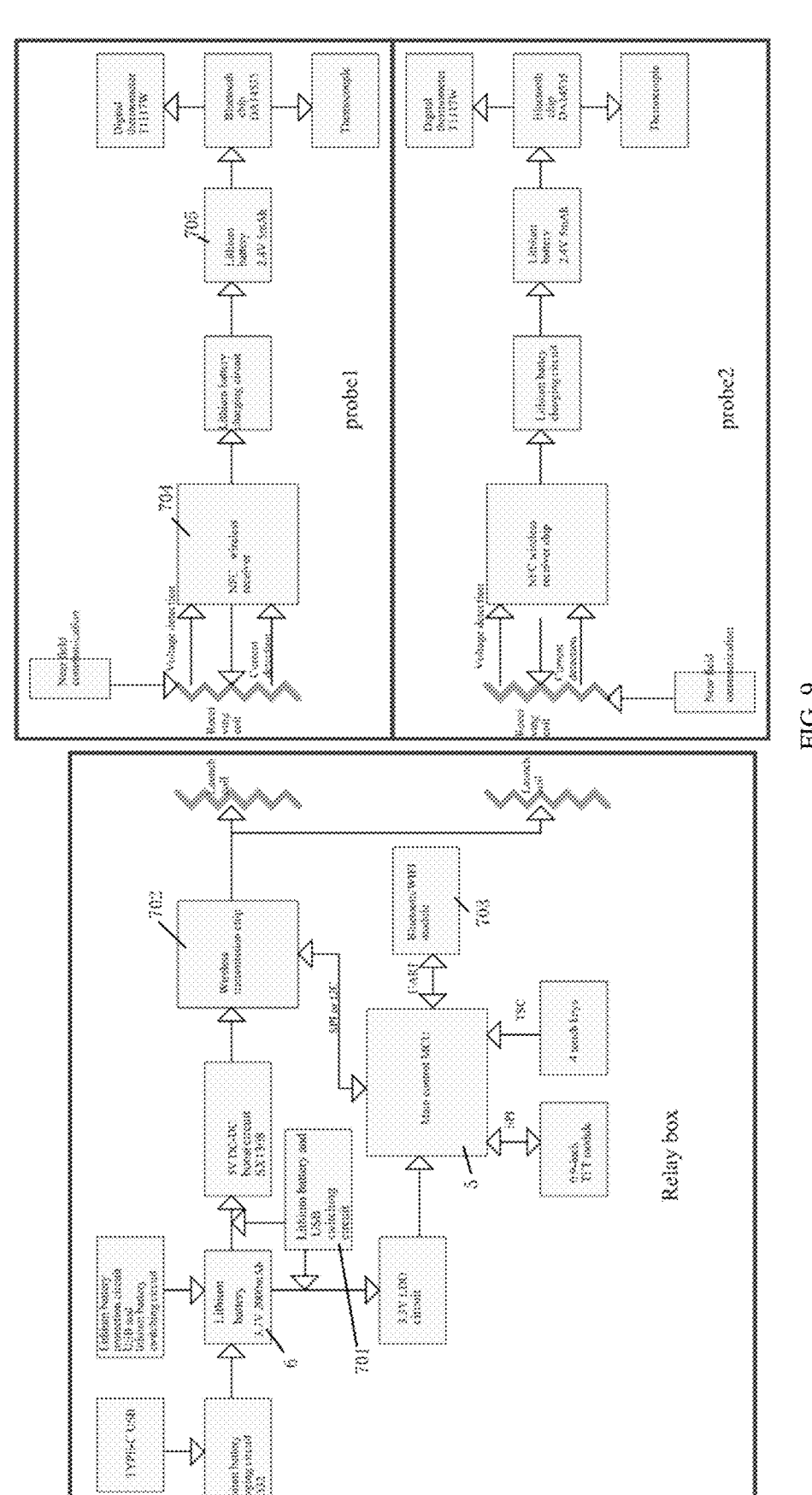
FIG. 9 is a flow chart of a circuit structure in a charge system for wireless temperature probe in an embodiment of the present application.

Further, as shown in FIG. 9, the charge system for wireless temperature probe further includes a power switching module 701, a wireless transmission module 702 and a Bluetooth module 703, which are located in the charging relay box 2, and a wireless receiving module 704 and a battery module of probe 705, which are located at the probe body 1. A power output end of the power supply module 6 is connected with a power input end of the power switching module 701, and a detection end of the power switching module 701 is configured to detect a voltage signal of an external adapter, so as to control the power supply switching between the external adapter and the power supply module 6. A data port of the Bluetooth module 703 is connected with a first data port of the control module 5, and a second data port of the control module 5 is connected with a data port of the wireless transmission module 702. A signal output end of the wireless transmission module 702 is connected with a signal input end of the second wireless charging component 4, the first wireless charging component 3 outputs power to the power input end of the wireless receiving module 704 through the near field communication, and the power output end of the wireless receiving module 704 is connected with the power input end of the battery module of probe 705.

In the present embodiment, the charge system for wireless temperature probe is integrated with the power switching module 701, the wireless transmission module 702 and the Bluetooth module 703 in the charging relay box 2. The wireless transmission module 702 includes a chip with a model of ST25R3916B. Additionally, the probe body 1 is further provided with the wireless receiving module 704 and the battery module of probe 705. The power output end of the power supply module 6 is connected with the power input end of the power switching module 701, and the detection end of the power switching module 701 is configured to detect the voltage signal of the external adapter and to control the power supply switching between the external adapter and the power supply module 6 according to a detection result, so as to ensure that the system may provide the required electric energy stably and reliably for the probe body 1. The data port of the Bluetooth module 703 is connected with the first data port of the control module 5, to realize the wireless communication between the probe body 1 and the external device. The second data port of the control module 5 is connected with the data port of the wireless transmission module 702, and the signal output end of the wireless transmission module 702 is connected with the signal input end of the second wireless charging component 4, to control a working state of the second wireless charging component 4. When the probe body 1 needs to be charged, the first wireless charging component 3 outputs the power to the power input end of the wireless receiving module 704 through near field communication, and then the wireless receiving module 704 transmits the electric energy to the power input end of the battery module of probe 705 to charge the battery module of probe 705. Additionally, the wireless receiving module 704 at the probe body 1 may further receive a signal from the wireless transmission module 702 and transmit the signal to the control module 5 for processing, thereby controlling and monitoring the working state of the probe body 1. Through the linkage of the above structural components, the charge system for wireless temperature probe may realize the intelligent power supply switching between the external adapter and the power supply module 6, thereby ensuring that the system may provide the required electric energy for the probe body 1 stably and reliably. Furthermore, a wireless communication between the probe body 1 and an external device may be realized, and the working state of the probe body 1 may be controlled and monitored, thereby improving the intelligentize degree and user experience of the system.

Specifically, the control module includes a control chip with a model of FT32F032G8BS7 SOP28, the wireless receiving module 704 includes a chip with a model of ST-ST25DV04K, and the Bluetooth module includes a chip with a model of ESP32-C3-Mini-1. The power supply module 6 includes a lithium battery unit, a power input end of the lithium battery unit is connected with a power output end of a lithium battery charging unit, and a power input end of the lithium battery charging unit is connected with the external adapter. The model of a charging chip contained in the lithium battery charging unit is IP2332, IP2332 is a synchronous switch buck and charging management chip with 5V input of a single lithium battery, which is integrated with a power MOS tube and adopts a synchronous switch architecture. With the above design, when in use, only fewer peripheral devices are required when IP2332 used, thereby reducing the overall size of the solution effectively, and thus reducing the BOM cost. IP2332 supports an NTC function and may realize a 5-phase NTC charging standard, including stopping charging at a low temperature or high temperature, and reducing the charging current or full voltage at medium and low temperature or medium and high temperature. Furthermore, IP2332 further has functions such as low standby current, dual-LED display, NTC battery temperature monitoring, and the like, and supports ESOP8 encapsulation. Therefore, IP2332 is suitable for charging a single lithium battery with high cost performance and multiple functions.

Furthermore, the lithium battery unit is connected with a lithium battery protection unit, the lithium battery protection unit includes a protection chip, an MOSFET switch tube, a current sensor and a control chip. The lithium battery unit is connected with the lithium battery protection unit through a VIN end and a GND end of the protection chip, so as to provide a working power. The VDD end and the GND end of the protection chip are connected to corresponding ports of the control chip, so as to receive instructions and monitoring signals of the control chip. The CHG end and the DISCH end of the protection chip are connected with a gate electrode of the MOSFET switch tube respectively, so as to control the on and off of the MOSFET switch tube. A drain electrode and a source electrode of the MOSFET switch tube are connected with a positive electrode and a negative electrode of the lithium battery unit respectively, so as to realize the charging and discharging control for the lithium battery unit. The output end of the current sensor is connected to the CS end of the protection chip, so as to transmit the monitored current signal to the protection chip. The ALM end and the GND end of the protection chip are connected to corresponding ports of the control chip, so as to transmit a protection state signal to the control chip. The corresponding ports of the control chip is further connected to an external indicator light or a protection warning circuit, so as to provide a user interface or output a protection warning signal. The protection chip is a core device, which monitors the voltage and current of the battery, and controls the on and off of the MOSFET switch tube according to a preset protection threshold, so as to realize an overcharging protection function, an over-discharging protection function, an over-current protection function and other functions. As an execution element, the MOSFET switch tube controls a charging and discharging path of the battery according to the instruction of the protection chip. The current sensor is used to monitor the charging and discharging current of the battery in real time and transmit the signal to the protection chip. The control circuit is configured to control the external indicator light or issues the protection warning according to the state signal of the protection chip, so that the user may take measures in time. The above architecture effectively prolongs the service life of the battery and improves the use safety by monitoring and controlling the charging and discharging process of the battery.

An LDO unit is provided between the control module 5 and the lithium battery unit, and BCT2057EUK33-TR is a linear voltage stabilizer with low power consumption, low noise and low voltage drop and is used to output voltage stably within an input voltage range of 1.6V to 5.5V, which includes an input end VIN, an output end VOUT, an enable end EN, a grounding end GND and a feedback end FB. The input end VIN is connected with the output end of the lithium battery unit to obtain an input voltage. The output end VOUT is connected with the power input end of the control module 5, so as to provide a stable working voltage. The enable end EN is configured to control the working state of the LDO unit and may switch on or switch off the LDO unit through an external signal. The grounding end GND is connected with the grounding end of the system so as to establish a reference level. The feedback end FB is connected with the output end VOUT through a resistor divider network, to monitor the output voltage and regulate the output of the LDO unit so as to keep stable. In this connection way, the LDO unit converts the unstable voltage provided by the lithium battery unit into the stable working voltage for the control module 5.

A dc-dc boosting unit is arranged between the wireless transmission module 702 and the lithium battery unit, the model of the dc-dc boost unit is AP3012KTR-E1, and AP3012KTR-E1 is a small efficient DC-DC boost converter, which is used to convert the low voltage input such as the lithium battery unit into a required higher voltage output. It includes an input end VIN, an output end VOUT, an enable end EN, a feedback end FB and a grounding end GND. The input end of VIN is connected with the output end of the lithium battery unit to obtain the voltage to be boosted, the output end VOUT is connected with the power input end of the wireless transmission module 702 so as to provide the required working voltage. The enable end EN is used to control the working state of the boost converter and may switch on or switch off the boost converter through an external signal. The feedback end FB is connected with the output end VOUT through a resistor divider network and used to monitor the output voltage and regulate the output of the boost converter so as to keep stable. The grounding end GND is connected with the grounding end of the system so as to establish a reference level. A power MOSFET and a control circuit are integrated inside AP3012KTR-E1, which may realize the efficient boosting conversion, and has a built-in over-current protection and thermal protection functions so as to ensure the safe running in a case of overload or overheating. It further has the characteristics of low standby current and wide input voltage range, which meets the power supply requirements of various portable electronic devices.

Furthermore, the control module 5 is further connected with a TFT module and 4 touch keys, and the control module 5 expands its functions by connecting the TFT module and the 4 touch keys. The TFT module has the model of MSP0963, also known as a thin-film transistor liquid-crystal display, which is a common display device for displaying images and texts. The TFT module usually includes a liquid crystal panel and a drive circuit, by which the liquid crystal panel is configured to display images, and the drive circuit is configured to control parameters of the liquid crystal panel such as the brightness, contrast, color, etc. In the charge system for wireless temperature probe, the control module 5 is connected with the TFT module to show all kinds of information for the user, such as a charging state, a temperature reading, a battery volume, and the like. Therefore, the user may know the state of the system in real time and perform corresponding operations according to the requirements. The 4 touch keys are a conventional human-machine interaction device, which allows the user to transmit the control signal by touch. In the charge system for wireless temperature probe, the control module 5 is connected with the 4 touch keys to receive the input of the user, such as starting charging, regulating the temperature set, etc. An intuitive and convenient method is provided for the user to interact with the system. In general, by connecting the TFT module and the 4 touch keys, the control module 5 may provide more functions and better user experience.

When an external 5V adapter is connected, the whole charging relay box 2 is powered by the 5V USB module. When there is no external adapter, the whole charging relay box 2 is powered by a 3.7V lithium battery. The above situation is accomplished by the 5VUSB and 3.7 lithium battery power switching module 701. When there is the external 5V adapter while the voltage of the 3.7V lithium battery is inadequate, the 5VUSB may charge the 3.7V lithium battery automatically through the lithium battery charging management chip. The NFC wireless charging transmission module transmits the energy to the receiving end of the probe through a transmission coil, so as to charge the lithium battery in the probe. By means of the WIFI & Bluetooth communication module, the wireless data transmission between it and the probe and the remote control of APP may be realized. By means of a 0.9TFT screen and the 4 touch keys, the human-machine interaction function may be realized. A main control MCU, as a main center, realizes a specific function of the product.

In conclusion, according to the technical solution, the charging relay box 2 and the probe body 1 are provided with the power switching module 701, the wireless transmission module 702 and the Bluetooth module 703, and the probe body 1 is provided with the wireless receiving module 704 and the battery module of probe 705, so that functions of adaptive power supply, wireless charging and data communication for the probe body 1 may be realized, and the intelligentization and reliability of the system may be improved.

The above embodiments are only used for illustrating the technical solutions of the present application rather than limiting the present application. Although the present application is described in detail with reference to the foregoing embodiments, it should be understood by those skilled in the art that the technical solutions described in the foregoing embodiments may be modified or some technical features may be equivalently substituted. However, these modifications or substitutions do not make the essence of the corresponding technical solutions depart from the spirit and scope of the technical solutions of various embodiments of the present application, and should fall within the protection scope of the present application.

LIST OF REFERENCE SIGNS

1 probe body
111 first handle
1111 first handle portion
1112 first sealing portion
1113 slot hole
112 first sealing ring
113 first probe tube
114 first internal assembly
121 second handle
1211 second handle portion
1212 second sealing portion
122 second sealing ring
123 second probe tube
124 second internal assembly
131 third handle
1311 third handle portion
1312 third sealing portion
1313 stop part 132 third sealing ring
133 third probe tube
134 third internal assembly
2 charging relay box
211 first upper shell
212 first lower shell
213 probe sleeve
214 first through hole
221 second upper shell
222 second lower shell
223 first clamping slit
224 first limit groove
231 third upper shell
232 third lower shell
233 second clamping slit
234 second limit groove
235 clamping plate
3 first wireless charging component
31 first charging coil
32 third charging coil
33 fifth charging coil
4 second wireless charging component
41 second charging coil
42 fourth charging coil
43 sixth charging coil
5 control module
51 second through hole
6 power supply module
701 power switching module
702 wireless transmission module
703 Bluetooth module
704 wireless receiving module
705 battery module of probe
8 guard wire of laser welding ring

What is claimed is:

1. A charge system for wireless temperature probe, comprising a probe body and a charging relay box detachably connected with the probe body, wherein the probe body is provided with a first wireless charging component and a sealing structure configured for sealing the first wireless charging component, the charging relay box is internally provided with a power supply module, a control module and a second wireless charging component configured to establish a near field communication path with the first wireless charging component, and the control module is configured to control the power supply module to adaptively supply power to the probe body through the near field communication path, wherein the probe body comprises a handle, a sealing ring, a probe tube and an internal assembly, a head of the internal assembly is inserted in the probe tube, and a tail of the internal assembly is inserted in the handle, wherein the charging relay box comprises an upper shell and a lower shell, the power supply module and the control module are arranged between the upper shell and the lower shell, the upper shell is configured with a clamping slit, the clamping slit is in clamping fit with the probe body, an outer side of the upper shell is configured with a limit groove, the limit groove is open upwards of the upper shell, the limit groove is configured to limit a position of a tail of the probe body, the upper shell is internally provided with a clamping plate extending downwards of the lower shell, the second wireless charging component comprises a second charging coil located in a gap between the clamping plate and the upper shell, the second charging coil corresponds to the tail of the probe body, the first wireless charging component comprises a third charging coil connected to the tail of the internal assembly and corresponding to the second charging coil, the handle comprises a handle portion, a sealing portion with a diameter smaller than a diameter of the handle portion and a stop part with a diameter greater than the diameter of the handle portion, the stop part is matched with the limit groove for limiting position, the sealing ring is sleeved on the sealing portion, a tail of the probe tube is sleeved on the sealing ring, the third charging coil is located inside the stop part, and the handle, the sealing ring and the probe tube form the sealing structure for sealing the first wireless charging component through a glass sintering process or a metal brazing process.

2. The charge system for wireless temperature probe according to claim 1, further comprising a power switching module, a wireless transmission module and a Bluetooth module, which are located in the charging relay box, and a wireless receiving module and a battery module of probe, which are located at the probe body, wherein a power output end of the power supply module is connected with a power input end of the power switching module, a detection end of the power switching module is configured to detect a voltage signal of an external adapter, so as to control a power supply switching between the external adapter and the power supply module, a data port of the Bluetooth module is connected with a first data port of the control module, a second data port of the control module is connected with a data port of the wireless transmission module, a signal output end of the wireless transmission module is connected with a signal input end of the second wireless charging component, the first wireless charging component is configured to output power to a power input end of the wireless receiving module through near field communication, and a power output end of the wireless receiving module is connected with a power input end of the battery module of probe.

* * * * *